United States Patent [19]
Dion

[11] Patent Number: 5,313,350
[45] Date of Patent: May 17, 1994

[54] PLUG-IN ACTUATOR LATCH MECHANISM

[75] Inventor: F. Eugene Dion, Longmont, Colo.

[73] Assignee: Maxtor Corporation, San Jose, Calif.

[21] Appl. No.: 975,846

[22] Filed: Nov. 13, 1992

[51] Int. Cl.$^5$ .................. G11B 17/02; G11B 21/22
[52] U.S. Cl. ................................. 360/97.01; 360/105
[58] Field of Search .......... 360/105, 106, 97.01–99.12

[56] References Cited
U.S. PATENT DOCUMENTS

| | | | |
|---|---|---|---|
| 4,819,153 | 4/1989 | Graham et al. | 360/99.08 |
| 4,979,062 | 12/1990 | Stefansky et al. | 360/97.02 |
| 5,041,924 | 8/1991 | Blackborow et al. | 360/98.04 |

Primary Examiner—Robert S. Tupper
Attorney, Agent, or Firm—Blakely, Sokoloff, Taylor & Zafman

[57] ABSTRACT

A card sized portable hard disk drive which has a latch mechanism that locks the actuator arm when the card is detached from a computer.

12 Claims, 4 Drawing Sheets

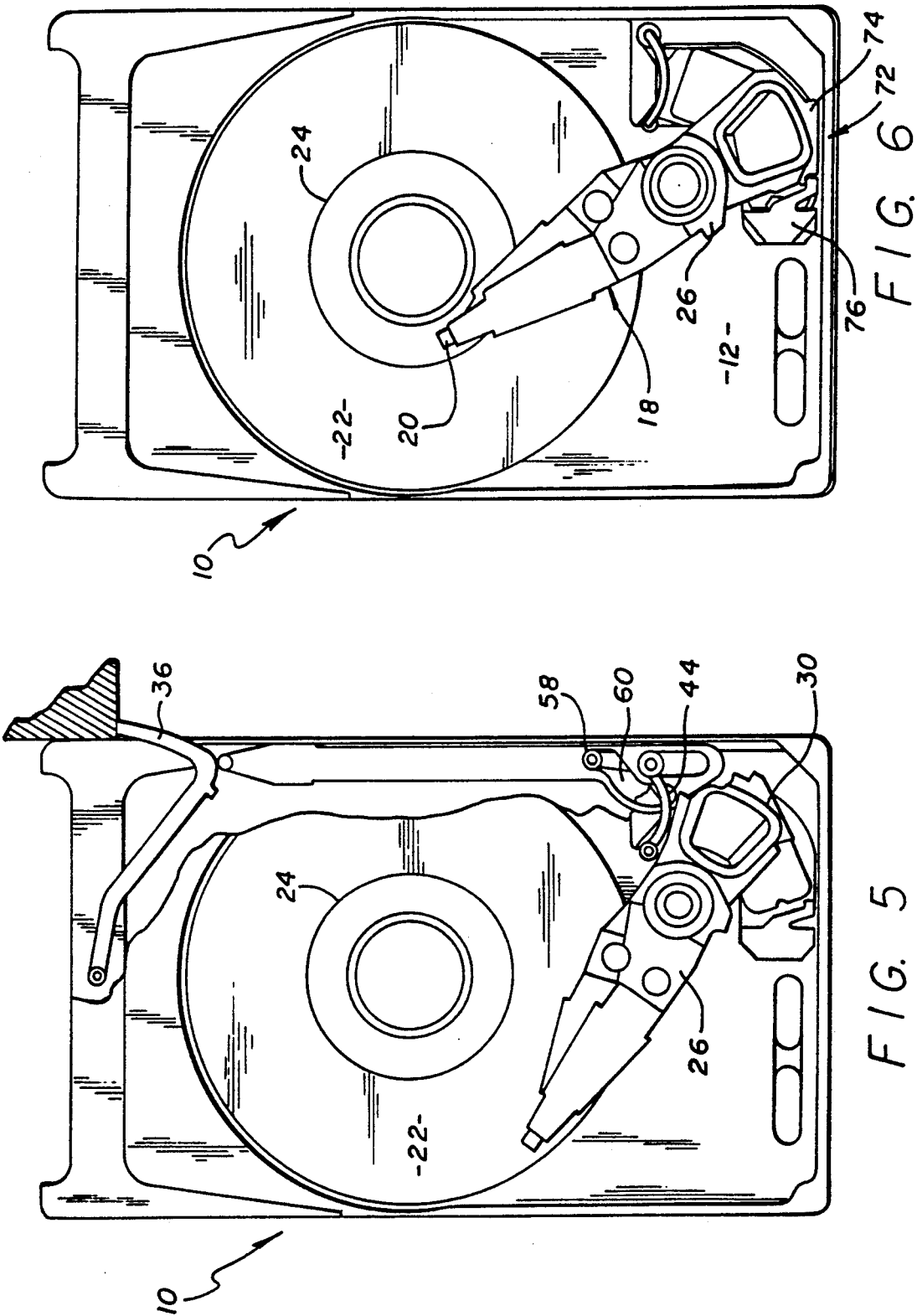

PLUG-IN ACTUATOR LATCH MECHANISM

BACKGROUND OF THE INVENTION

1. Field of the Invention

The present invention relates to a hard disk drive assembly.

2. Description of Related Art

Hard disk drives typically have an actuator arm which can move relative to a magnetic disk that is rotated by an electric motor. At the end of the actuator arm is a magnetic head which can magnetize or sense the magnetic field of the disk. The magnetic head is typically separated from the surface of the disk by an air gap that is on the order of 0.06 microns in length. Any contact between the head and the magnetic disk may result in a loss of data or possible damage to the disk.

It has become desirable to construct hard disk drives as portable pluggable card units which can be connected to a computer. Because portable card units are frequently handled by the user, the drive units are susceptible to external shock loads which may damage the actuator arm assembly of the disk drive. It would therefore be desirable to have a latch assembly which locks the actuator arm of a portable disk drive when the card unit is detached from the computer, and which allows the arm to freely rotate when plugged into the computer. To simplify usage of the card size drive unit, it would also be desirable to have an actuator locking mechanism that self-engages when detached from the computer.

SUMMARY OF THE INVENTION

The present invention is a latch assembly which locks the actuator arm of a hard disk drive. The hard disk drive is typically constructed as a portable card size unit which has a female connector that can be plugged into a corresponding male connector of a computer. The card unit also contains a magnetic disk which spins relative to the actuator arm. The magnetic disk typically contain a read/write zone and a landing zone located adjacent to the center of the disk. Attached to the actuator arm is a magnetic head which can be moved within and between the read/write zone and landing zone of the disk.

The latch assembly contains a rotatable first latch that is coupled to a rotatable second latch by a push rod and a cam actuated bell crank. The second latch is adapted to engage the actuator arm and move the magnetic head to the landing zone of the disk, when the card unit is detached from the computer. When the card is plugged into the computer, the first latch engages the connector of the computer and rotates into an unlocked positioned. Rotation of the first latch, moves the push rod and rotates the second latch, so that the second latch is disengaged from the actuator arm. The actuator arm is then free to move into the read/write zone of the disk. When the card is detached from the computer, a spring pushes the latches and push rod back into a locked position. Movement of the latch assembly into the locked position, causes the second latch to engage the actuator arm and rotate the magnetic heads into the landing zone of the disk.

Therefore it is an object of the present invention to provide a card sized portable hard disk drive which self-locks the actuator arm when the card is detached from a computer.

BRIEF DESCRIPTION OF THE DRAWINGS

The objects and advantages of the present invention will become more readily apparent to those ordinarily skilled in the art after reviewing the following detailed description and accompanying drawings, wherein:

FIG. 5 is a view similar to FIG. 4 showing the disk drive completely inserted into the computer;

FIG. 6 is cross-sectional view showing a detent assembly that locks the actuator arm of the disk drive;

DETAILED DESCRIPTION OF THE INVENTION

Figure 1:
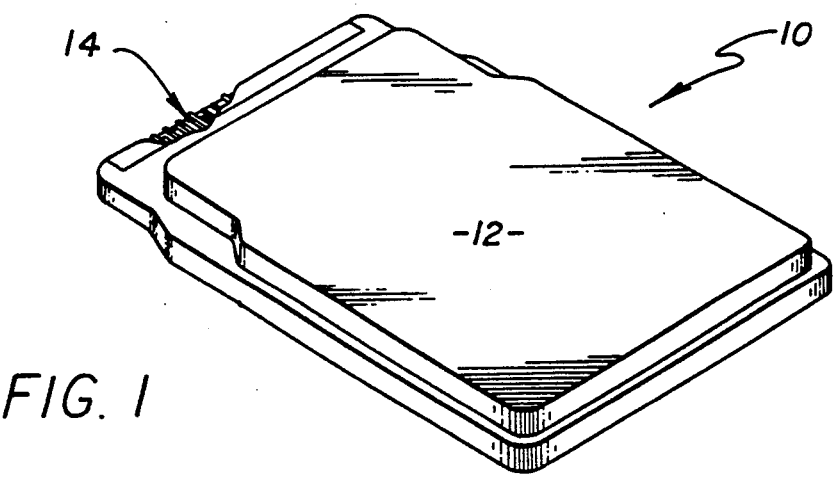
FIG. 1 is a perspective of a hard disk drive of the present invention.

Referring to the drawings more particularly by reference numbers, FIG. 1 shows a hard disk drive card unit 10 of the present invention. The hard disk unit 10 typically has a pocket size outer housing 12 with an electrical female connector 14 located at one end of the card 10. The hard disk drive card unit 10 can be plugged into a slot within a computer chassis and mated with a corresponding male connector, to couple the hard disk with the computer.

Figure 2:
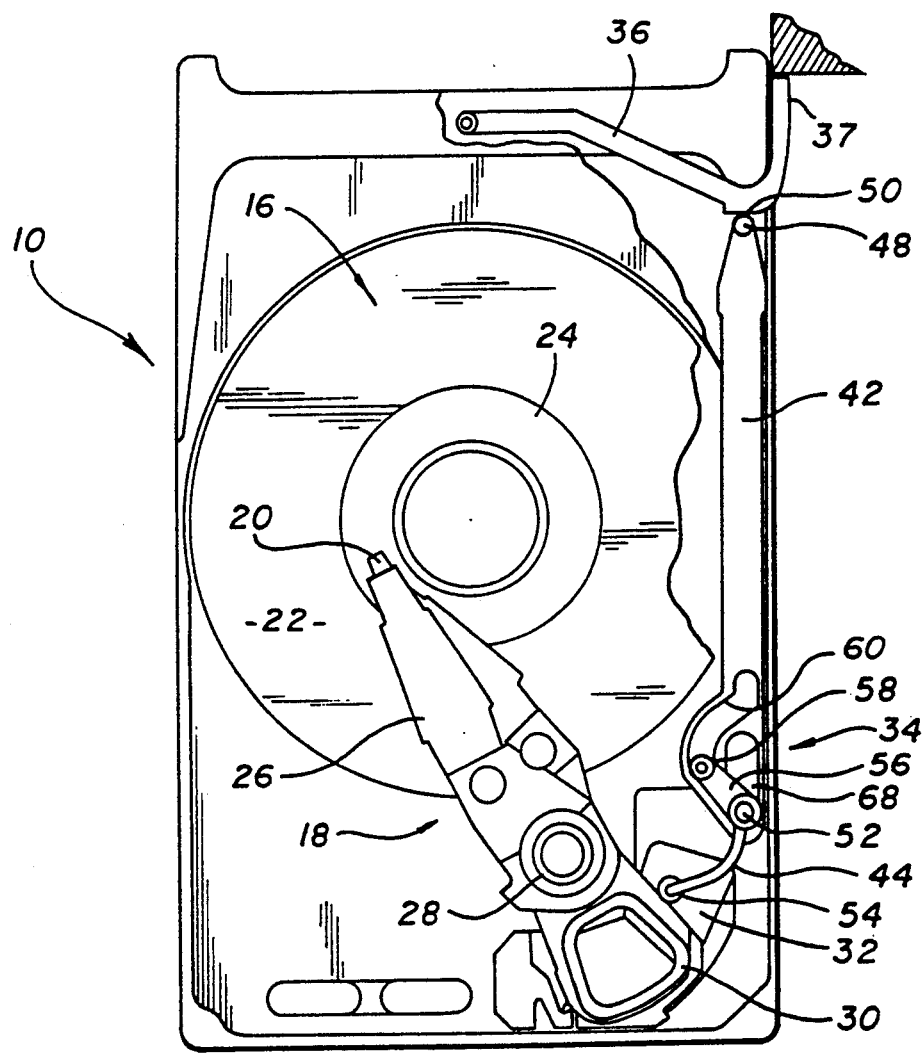
FIG. 2 is a cross-sectional top view of the hard disk of FIG. 1.
Figure 3:
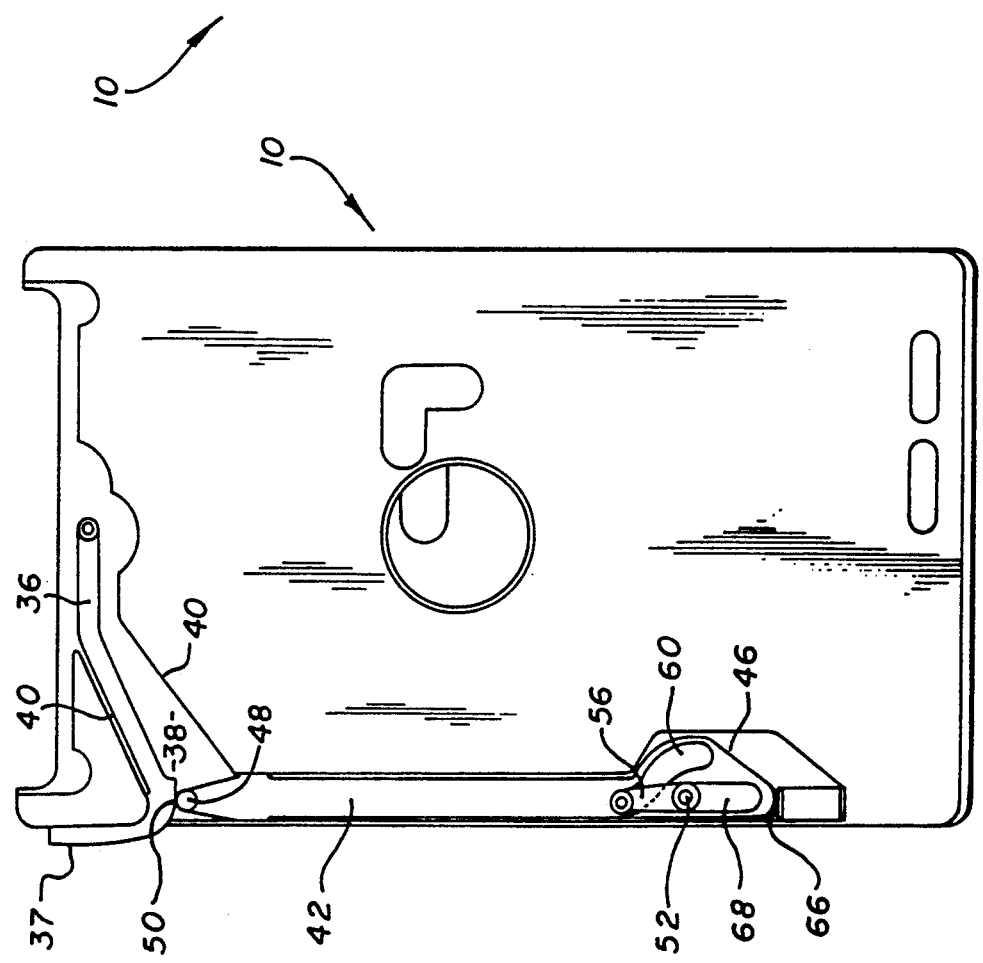
FIG. 3 is a bottom view of the hard disk of FIG. 1.

FIGS. 2 and 3 show the inner components of the card unit 10. The card unit 10 has one or more magnetic disk 16 which are typically coupled to an electric motor (not shown) which rotates the disk 16 relative to an actuator arm assembly 18. The actuator arm assembly 18 contains magnetic heads 20 which can magnetize and sense the magnetic field of the disk 16. The magnetic disks 16 store digital information in a read/write zone 22 of the disk 16. Most magnetic disk are constructed to also have a landing zone 24 located adjacent to the center of the disk 16. The landing zone 24 is typically not magnetized and provides an area of the disk 16 where the actuator arm assembly 18 is positioned when the disk 16 is not spinning. Placing the magnetic heads 20 within the landing zone 24, prevents data from being lost if the heads 20 damage the stationary disk 16, which may occur if the unit 10 is subjected to an external shock or vibrational load.

The actuator arm assembly 18 includes an actuator arm 26 which is pivotally connected to the housing by a bearing assembly 28. At the end of the arm 26 is a coil 30 that is adjacent to a magnetic plate 32. The coil 30 is connected to a control circuit (not shown) which can energize the coil 30 to induce movement between the actuator arm 26 and magnet 32. Movement of the actuator arm 26 moves the magnetic heads 20 relative to the surface of the disk 16. The control circuit can move the actuator arm 26 within and between the read/write zone 22 and landing zone 24 of the disk 16.

The card unit 10 has a latch assembly 34 that can move the actuator arm 26 from the read/write zone 22 to the landing zone 24, when the card 10 is detached from the computer. The latch assembly 34 includes a first latch 36 which is pivotally connected to the housing 12 by pin 35. The first latch 36 has a pawl 37 and is adapted to move between a locked position and an unlocked position. As shown in FIG. 3, the first latch 36 rotates through a first channel 38 within the housing 12. The housing 12 has a pair of stop surfaces 40 which limit the travel of the first latch 36.

The latch assembly 34 further includes a push rod 42 that couples the first latch 36 to a second latch 44. The push rod 42 can move along a second channel 46 within the housing 12. The push rod 42 has a sliding contact surface 48 which engages the first latch 36 and moves the latch 36 from the unlocked position to the locked position. The latch 36 preferably has a landing portion 50 which provides a flat surface for the roller 48. The pin 52 rotates relative to the housing 12 and typically has a seal (not shown) which prevents contaminants from entering the drive unit.

The second latch 44 is pivotally connected to the housing 12 by pin 52. The second latch 44 has a roller 54 which can engage the actuator arm 26 and move the magnetic heads 20 from the read/write zone 22 to the landing zone 24 of the disk 16. The second latch 44 is also coupled to a bell crank 56 which is pivotally connected to the housing 12 by pin 52. The bell crank 56 has a cam follower 58 which moves within a cam slot 60 in the push rod 42. The bell crank 56 is preferably coupled to the second latch 44 by an elliptical stud (not shown) that extends into an elliptical slot (not shown) in the crank 56, such that the second latch 44 rotates in conjunction with the movement of the bell crank 56.

The cam follower 58 is adapted to follow the cam slot 60 and rotate the bell crank 56 and second latch 44 when the push rod 42 moves within the second channel 46. Located between the end of the push rod 42 and the end of the second channel 46 is a compression spring 66 which biases the rod 42 and first latch 36 into the locked position. The push rod 42 has a clearance slot 68 which allows the rod 42 to the move relative to the pin 52.

Figure 4:
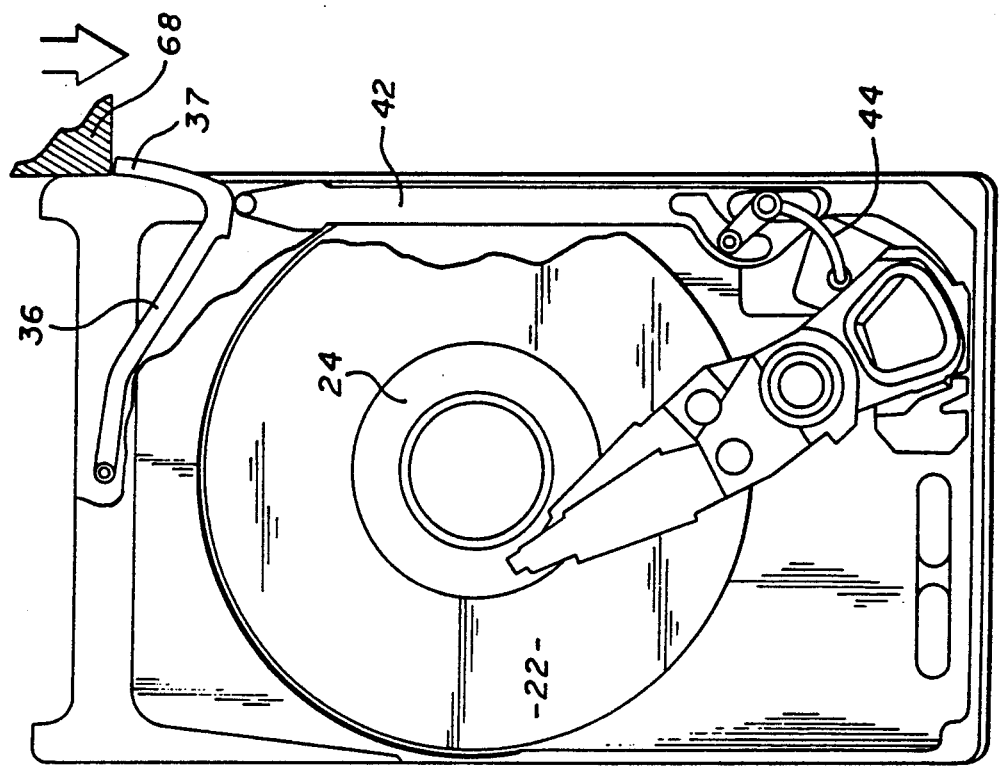
FIG. 4 is a view similar to FIG. 2 showing the disk drive being inserted into a computer.

As shown in FIG. 4, when the card unit 10 is plugged into a computer, the pawl 37 engages a stationary member 68 within the computer. In the preferred embodiment, the stationary member 68 is a keying feature of the mating computer connector. Pushing the card 10 closer to the mating connector moves the first latch 36 into the unlocked position. As shown in FIG. 5, movement of the first latch 36 pushes the rod 42, which causes the cam roller 50 to move within the cam slot 60. As the cam roller 58 follows the cam slot 60, the bell crank 56 rotates the second latch 44 away from the actuator arm 26. The actuator arm 26 may then rotate into the read/write zone 22 of the disk 16 by the coil 30.

When the card unit 10 is pulled out of the computer, the first latch 36 is released from the stationary member 68. Releasing the first latch 36 causes the compression spring 66 to move the push rod 42 and latch 36 back into the locked positions. Movement of the push rod 42 induces a rotation of the bell crank 56 and second latch 44, so that the latch 44 engages the actuator arm 26 and moves the magnetic heads 20 from the read/write zone 22 to the landing zone 24 of the disk 16. The force of the compression spring 66 prevents the latch 44 from moving, so that the actuator arm 22 and heads 20 do not move into the read/write zone 22 of the drive 16, if the unit 10 is subjected to an external shock or vibrational load.

As shown in FIG. 6, the card unit 10 has a detent assembly 70. The detent assembly 72 includes a first detent 74 that is attached to the actuator arm 26 and a second detent 76 which is mounted to the housing 12. If power to the card unit 10 is terminated while the card is plugged into the computer, the disk 16 will spin down and the control circuit will cause the actuator arm 26 to move the magnetic heads 20 into the landing zone 24 of the disk 16. When the actuator arm 26 moves the heads 20 into the landing zone 24, the detents 74 and 76 become attached and prevent further movement of the actuator arm assembly 18. The detent assembly 70 prevents damage to the disk 16 when the card unit 10 is plugged into a portable computer, which may be exposed to external shock loads when the latch assembly is not constraining the actuator arm 26 to the landing zone 24. The detent assembly 72 secures the actuator arm 26 when the card is detached from the computer, and when the card is plugged into the computer and power to the drive unit 10 is terminated.

Figure 7:
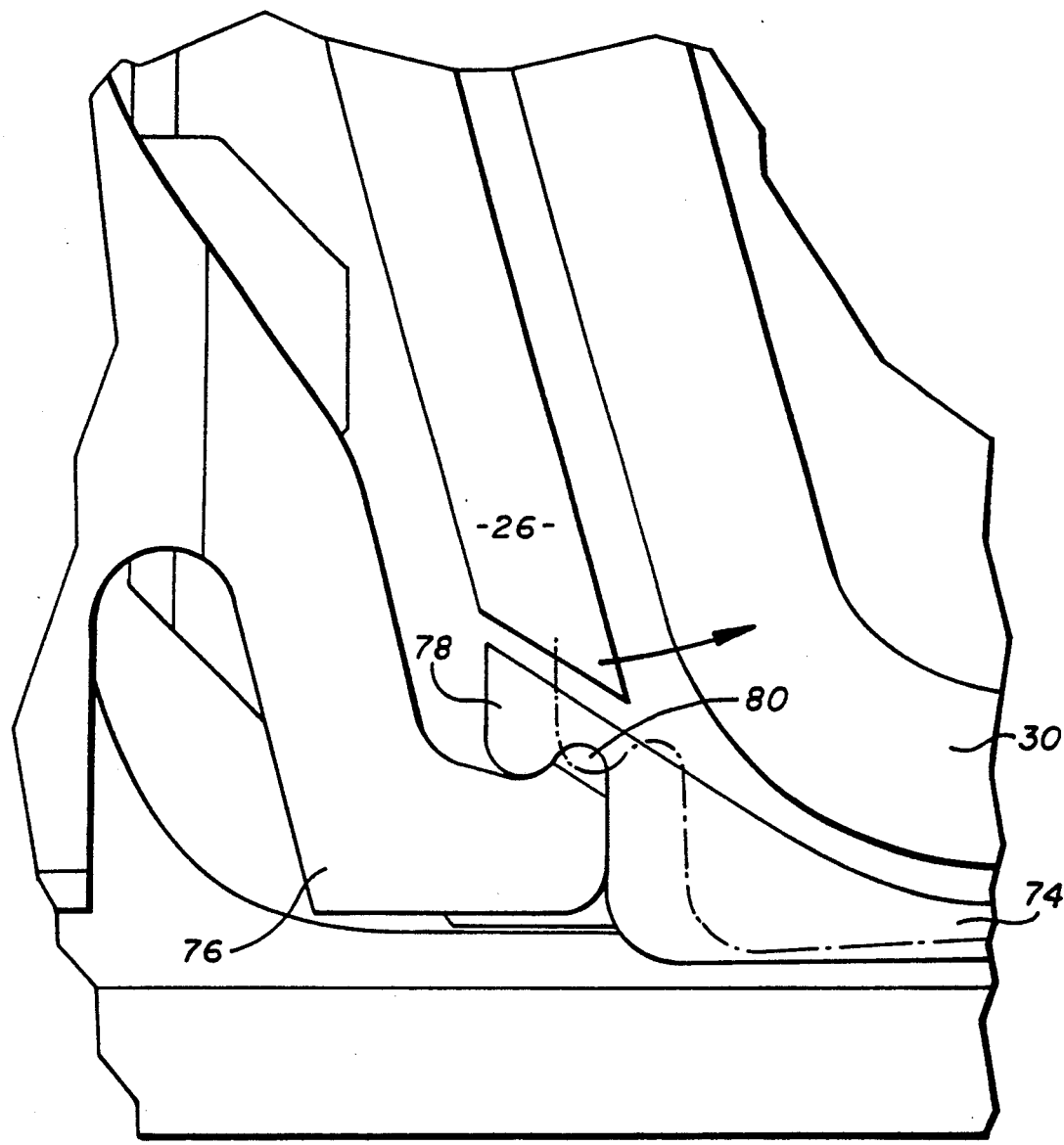
FIG. 7 is an enlarged view of the detent assembly of FIG. 6.

As shown in FIG. 7, the first detent latch 74 has a first tooth 78 which becomes locked with a second tooth 80 of the second detent latch 76 when the actuator arm 26 is rotated into the landing zone 24 of the disk 16. The detent latches are typically constructed from a plastic material which is flexible enough to bend so that the teeth become engaged when the actuator arm 26 is rotated into the landing zone 24. When power is supplied to the card unit, the control circuit energizes the coil 30, which pulls the actuator arm 26 away from the second detent latch 76. The detent latches 74 and 76 are flexible enough so that the latches become detached when the coil 30 is energized.

The present invention thus provides a pair of latching assemblies which lock the actuator arm of a portable hard disk drive that is not receiving power, either when the card is detached, or plugged into the computer.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. A hard disk drive card unit that can be coupled to a first connector of a computer, comprising:
   a housing having a second connector adapted to be mated with the first connector;
   a magnetic disk operatively connected to said housing, said magnetic disk having a read/write zone and a landing zone;
   an actuator arm assembly coupled to said housing and adapted to move a magnetic head between said read/write zone and said landing zone of said magnetic disk; and,
   latch means for securing said magnetic head within said landing zone of said magnetic disk when said second connector is detached from the first connector.

2. The card unit as recited in claim 1, wherein said latch means includes a first latch connected to said housing and adapted to move between a locked position and an unlocked position, a second latch connected to said housing and adapted to move said actuator arm assembly between said read/write zone and said landing zone of said magnetic disk, and a push rod coupled to said first latch and said second latch so that said second latch moves said actuator arm assembly to said landing zone when said first latch moves from said unlocked position to said locked position.

3. The card unit as recited in claim 2, wherein said latch means includes biasing means for biasing said first latch into said locked position.

4. The card unit as recited in claim 3, wherein said first latch include a pawl adapted to engage the first connector and move said first latch into said unlocked position when said second connector is mated with the first connector.

5. The card unit as recited in claim 4, wherein said latch means includes a bell crank connected to said housing and coupled to said second latch, said bell crank having a cam follower which can move within a cam slot in said push rod so that said second latch moves said actuator arm assembly to said landing zone when said first latch moves to said locked position.

6. The card unit as recited in claim 2, wherein said latch means further includes a first detent attached to said actuator arm assembly and a second detent mounted to said housing, said detents engage and become locked when said actuator arm assembly is moved to said landing zone of said magnetic disk.

7. A computer assembly, comprising:
a computer chassis that has a slot;
a first connector located within said slot, said first connector having a latch engagement surface;
a housing having a second connector adapted to be mated with said first connector;
a magnetic disk operatively connected to said housing, said magnetic disk having a read/write zone and a landing zone;
an actuator arm assembly coupled to said housing and adapted to move a magnetic head between said read/write zone and landing zone of said magnetic disk; and,
latch means for engaging said latch engagement surface of said first connector and securing said magnetic head within said landing zone of said magnetic disk when said latch means is disengaged from said latch engagement surface.

8. The card unit as recited in claim 7, wherein said latch means includes a first latch pivotally connected to said housing and adapted to move between a locked position and an unlocked position, a second latch connected to said housing and adapted to move said actuator arm assembly between said read/write zone and said landing zone of said magnetic disk, and a push rod coupled to said first and second latch so that said second latch moves said actuator arm assembly to said landing zone when said first latch moves from said unlocked position to said locked position.

9. The card unit as recited in claim 8, wherein said latch means further includes a first detent attached to said actuator arm assembly and a second detent mounted to said housing, said detents engage and become locked when said actuator arm assembly is moved to said landing zone of said magnetic disk.

10. The card unit as recited in claim 9, wherein said latch means includes biasing means for biasing said first latch into said locked position.

11. The card unit as recited in claim 10, wherein said first latch include a pawl adapted to engage said latch engagement surface and move said first latch into said unlocked position when said second connector is mated with said first connector.

12. The card unit as recited in claim 11, wherein said latch means includes a bell crank connected to said housing and coupled to said second latch, said bell crank having a cam follower which can move within a cam slot in said push rod so that said second latch moves said actuator arm assembly to said landing zone when said first latch moves to said locked position.

* * * * *